United States Patent

Kurosaki et al.

Patent Number: 5,257,052
Date of Patent: Oct. 26, 1993

[54] ELECTRICALLY DRIVING APPARATUS OF MIRROR IN SINGLE-LENS REFLEX CAMERA

[75] Inventors: Masahiko Kurosaki; Toshiyuki Kitazawa, both of Tokyo, Japan

[73] Assignee: Asahi Kogaku Kogyo Kabushiki Kaisha, Tokyo, Japan

[21] Appl. No.: 807,814

[22] Filed: Dec. 16, 1991

Related U.S. Application Data

[63] Continuation of Ser. No. 403,383, Sep. 6, 1989, abandoned.

[30] Foreign Application Priority Data

Sep. 7, 1988 [JP] Japan .................. 63-117465[U]
Sep. 13, 1988 [JP] Japan ...................... 63-229258

[51] Int. Cl.⁵ ............................................. G03B 19/12
[52] U.S. Cl. ...................... 354/153; 354/173.1; 354/234.1
[58] Field of Search .......... 354/152, 153, 173.1, 354/173.11, 201, 405, 234.1

[56] References Cited

U.S. PATENT DOCUMENTS

| | | | |
|---|---|---|---|
| 3,756,135 | 9/1973 | Erlichman | 354/153 |
| 4,272,171 | 6/1981 | Hashimoto et al. | 354/152 |
| 4,326,783 | 4/1982 | Kawamura et al. | 354/201 X |
| 4,338,009 | 7/1982 | Lee | 354/152 |
| 4,360,257 | 11/1982 | Kurei | 354/228 |
| 4,681,417 | 7/1987 | Fujino et al. | 354/271.1 |
| 4,692,010 | 9/1987 | Kataoka et al. | 354/273 |
| 4,720,718 | 1/1988 | Yamamoto et al. | 354/154 |
| 4,841,327 | 6/1989 | Yamamoto et al. | 354/152 X |
| 4,881,092 | 11/1989 | Fukahori et al. | 354/173.1 X |
| 4,899,187 | 2/1990 | Alligood | 354/152 |

FOREIGN PATENT DOCUMENTS

| | | | |
|---|---|---|---|
| 3209952 | 9/1982 | Fed. Rep. of Germany . | |
| 2850913 | 5/1984 | Fed. Rep. of Germany . | |
| 63-80239 | 4/1988 | Japan | 354/153 |
| 63-103222 | 5/1988 | Japan | 310/323 |
| 1293040 | 10/1972 | United Kingdom . | |
| 2102132 | 1/1983 | United Kingdom . | |

Primary Examiner—David M. Gray
Attorney, Agent, or Firm—Sandler Greenblum & Bernstein

[57] ABSTRACT

A mirror driving apparatus of a single-lens reflex camera has a mirror box, a mother plate which is provided on the side face of the mirror box to support a gear train and a mirror box mechanism which is driven by the gear train, and a motor having a drive shaft with a pinion integral therewith for driving the gear train. The motor is located on a side of the mirror box, so that the drive shaft extends perpendicularly to the plane of the mother plate. The pinion of the drive shaft of the motor and the gear train are all composed of spur gears.

20 Claims, 7 Drawing Sheets

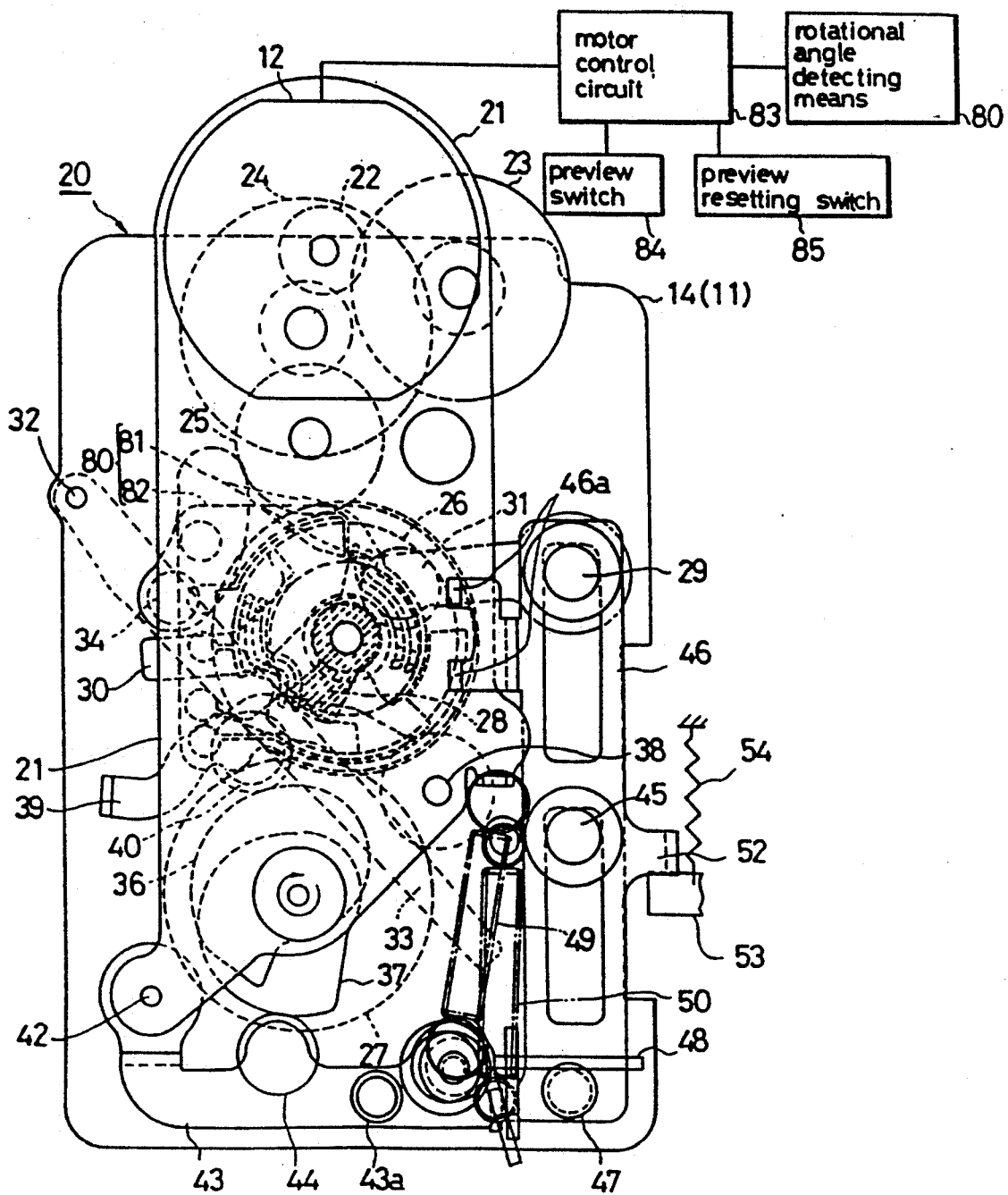
FIG. IA

ELECTRICALLY DRIVING APPARATUS OF MIRROR IN SINGLE-LENS REFLEX CAMERA

This application is a continuation of application Ser. No. 07/403,383, filed Sep. 16, 1989 now abandoned.

BACKGROUND OF THE INVENTION

1. Field of the Invention

The present invention relates to an electrically driven apparatus having a motor for driving a mirror in a single-lens reflex camera, and more precisely, it relates to an apparatus (previewer) for detecting or confirming a focal depth.

2. Description of Related Art

In recent cameras, particularly in an expensive single-lens reflex camera, a mirror is driven by a motor. The mirror driving apparatus has a mother plate provided on the side face of a mirror box to support a gear train which is driven by the motor and a mirror box mechanism which is driven by the rotation of the gear train. The mirror box mechanism usually performs successive operations of stepping down of an aperture of a lens, an upward movement of the mirror, a release of a mechanical engagement of an electromagnetic shutter, a downward movement of the mirror after the shutter operates, and a release of the stop-down of the lens aperture. Accordingly, in the mirror driving mechanism, it is necessary to engage the gear train supported on the side face of the mirror box with a drive shaft of the motor. However, in the conventional apparatus, the drive shaft of the motor extends in parallel with the side face of the mirror accordingly a worm-wheel mechanism or a bevel gear mechanism must be provided between the drive shaft of the motor and the gear train. However, the worm-wheel mechanism and the bevel gear mechanism are very expensive and have a low driving force transmission efficiency. Furthermore, it is difficult to preform the motor integral with the mirror box, resulting in the difficulty of realizing a united mirror box incorporating the motor therein. Namely, upon assembly, the gear on the mirror box side must be precisely engaged with the gear of the drive shaft of the motor.

A single-lens reflex camera having a motor provided on the bottom of the mirror box is also known. However, in such a recent AF single-lens reflex camera, an AF distance measuring module is located on the bottom of the mirror box. Accordingly, the motor cannot be located on the bottom of the mirror box.

On the other hand, in a conventional previewer of a single-lens reflex camera, the stop-down operation is mechanically effected by a manual lever. However, since the diaphragm is usually biased in an open position with a relatively large force, a photographer must operate the manual lever with a large force against the biasing force making it very difficult for a photographer to maintain the stop-down position.

A camera having a holding device which maintains the stop-down position is also known. However, in this type of camera, reset and set operations, which are troublesome, are necessary. If the previewer is actuated by an electrical drive mechanism of the mirror, a photographer's burden could be decreased.

SUMMARY OF THE INVENTION

The primary object of the present invention is to provide an inexpensive mirror driving apparatus having a high transmission efficiency and a united mirror box.

Another object of the present invention is to provide a mirror driving apparatus which can be advantageously applied to an AF single-lens reflex camera, in which a motor can be located in a place other than a bottom portion of a mirror box.

Still another object of the present invention is to provide a depth detecting or confirming apparatus (previewer) which can detect the focal depth with the help of the mirror driving apparatus.

The inventors of the present invention have found that the drawbacks mentioned above can be eliminated when the motor is located on the side of the mirror box in which a relatively large space exists and when the drive shaft of the motor extends perpendicularly to the mother plate on the side face of the mirror box.

To achieve the objects mentioned above, according to the present invention, there is provided a mirror driving apparatus of a single-lens reflex camera comprising a mirror box, a mother plate which is provided on the side face of the mirror box to support a gear train and a mirror box mechanism which is driven by the gear train, and a motor having a drive shaft with a pinion integral therewith for driving the gear train, wherein said motor is located on a side of the mirror box, so that the drive shaft extends perpendicularly to the plane of the mother plate, and wherein said pinion of the drive shaft of the motor and said gear train are all composed of spur gears.

In a conventional single-lens reflex camera having a mirror box which has therein a mirror actuating cam gear and a shutter and diaphragm actuating cam gear which are rotated by one turn by a forward rotation of a driving motor from an initial rest position at the shutter release, respectively, the shutter is actuated after the shutter and diaphragm actuating cam gear is rotated to stop-down the diaphragm to a predetermined diaphragm value. Then the mirror is retracted from the optical path by the rotation of the mirror actuating cam gear, whereby the mirror is returned to the initial position after the shutter is actuated. The inventors have conceived that if the mirror actuating cam gear and the shutter and diaphragm actuating cam gear are reversed after they are rotated by a predetermined angle in the forward direction, the depth can be confirmed or detected without operating the mirror and the shutter (including the associated members).

According to another aspect of the present invention, the mirror driving apparatus comprises a rotational angle detecting means for detecting the preview rotational position at which the diaphragm (the stop) is actuated but the shutter and the mirror are not actuated after the mirror actuating cam gear and the shutter and diaphragm actuating cam gear are rotated from the initial rest positions, a preview switch separate from the release switch for sending a signal of a forward rotation to the motor, a motor control circuit for starting the forward rotation of the motor in accordance with the forward rotation signal of the preview switch and for stopping the motor when the rotational angle detecting means detects the preview rotational position, and a preview resetting switch for sending a signal of reverse rotation to the motor after the motor stops, the motor control circuit reversing the motor in accordance with the reverse rotation signal of the preview resetting switch to stop the motor when the mirror actuating cam gear and the shutter and diaphragm actuating cam gear are returned to the respective initial rest positions.

The stop signal of the motor can be obtained by the rotational angle detecting means. Alternatively, it is also possible to obtain the stop signal from an initial position detecting means for detecting the initial rest positions of the mirror actuating cam gear and the shutter and diaphragm actuating cam gear.

The preview switch and the preview resetting switch are composed of separate pieces, but preferably of the same switch which has different operational positions.

The depth confirming device of the present invention is in principle independent from the position of the motor and the drive shaft thereof. However, the special positional relation of the motor and the drive shaft thereof, as specified above, makes a realization of a united compact mirror box possible.

BRIEF DESCRIPTION OF THE DRAWINGS

The invention will be described below in detail with reference to the accompanying drawings, in which:

FIGS. 1A, 1B and 2 are side elevational views as viewed from the direction shown at an arrow I in FIG. 6, showing an embodiment of a mirror driving apparatus (previewer) of a single-lens reflex camera, shown in different operational positions, according to the present invention, wherein FIG. 1B shows the same operational position as FIG. 1A, but in which a rotational angle detecting switch etc. are omitted in FIG. 1B for the purpose of simplification;

DETAILED DESCRIPTION OF PREFERRED EMBODIMENTS

Figure 6:
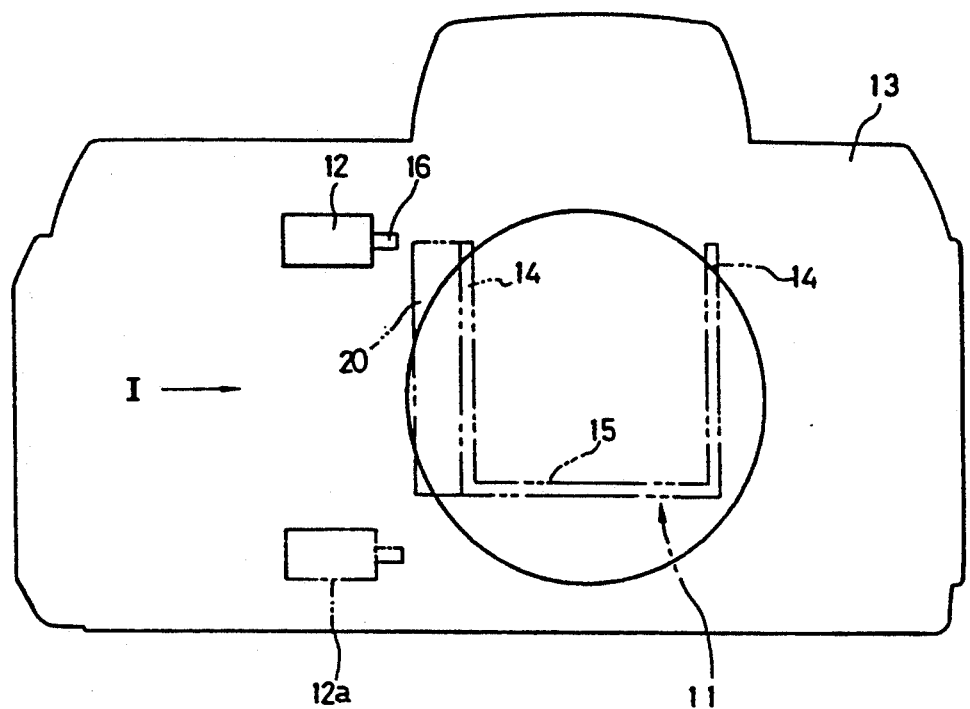

FIG. 6 shows an arrangement of a mirror box 11 and a motor 12, of a mirror driving mechanism. The mirror box 11 which is located substantially at the center of a camera body 13 has a plurality of mother plates 14 located on side faces thereof and a bottom plate 15. A mirror box mechanism 20 is provided on the left mother plate 14 (as viewed from front). The motor 12 has a drive shaft 16 which is perpendicular to the side planes of the mother plates 14, above the mirror box mechanism 20. The motor 12 is located above a film-winding spool and a sprocket chamber of the camera body.

Figure 1B:
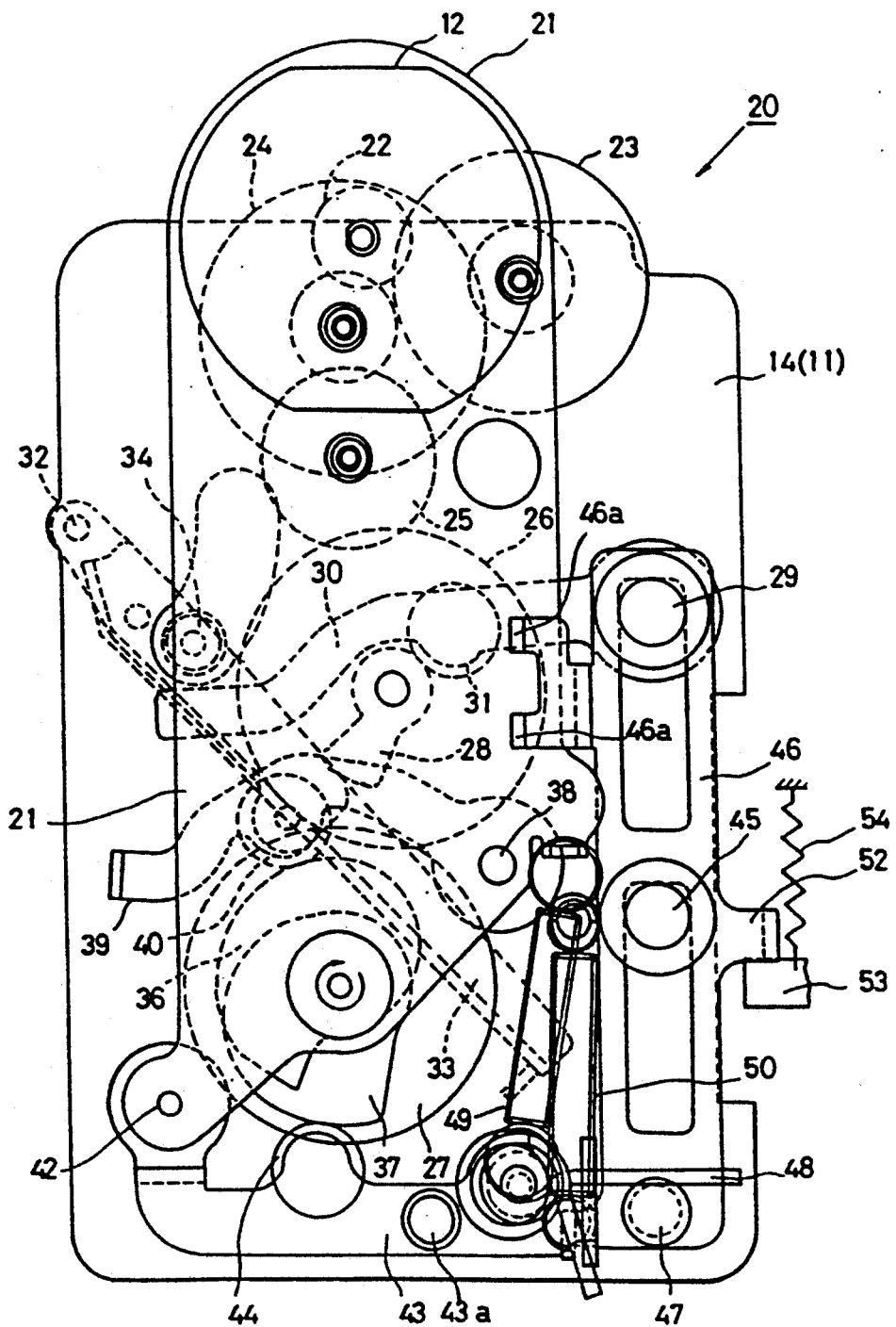
Figure 2:
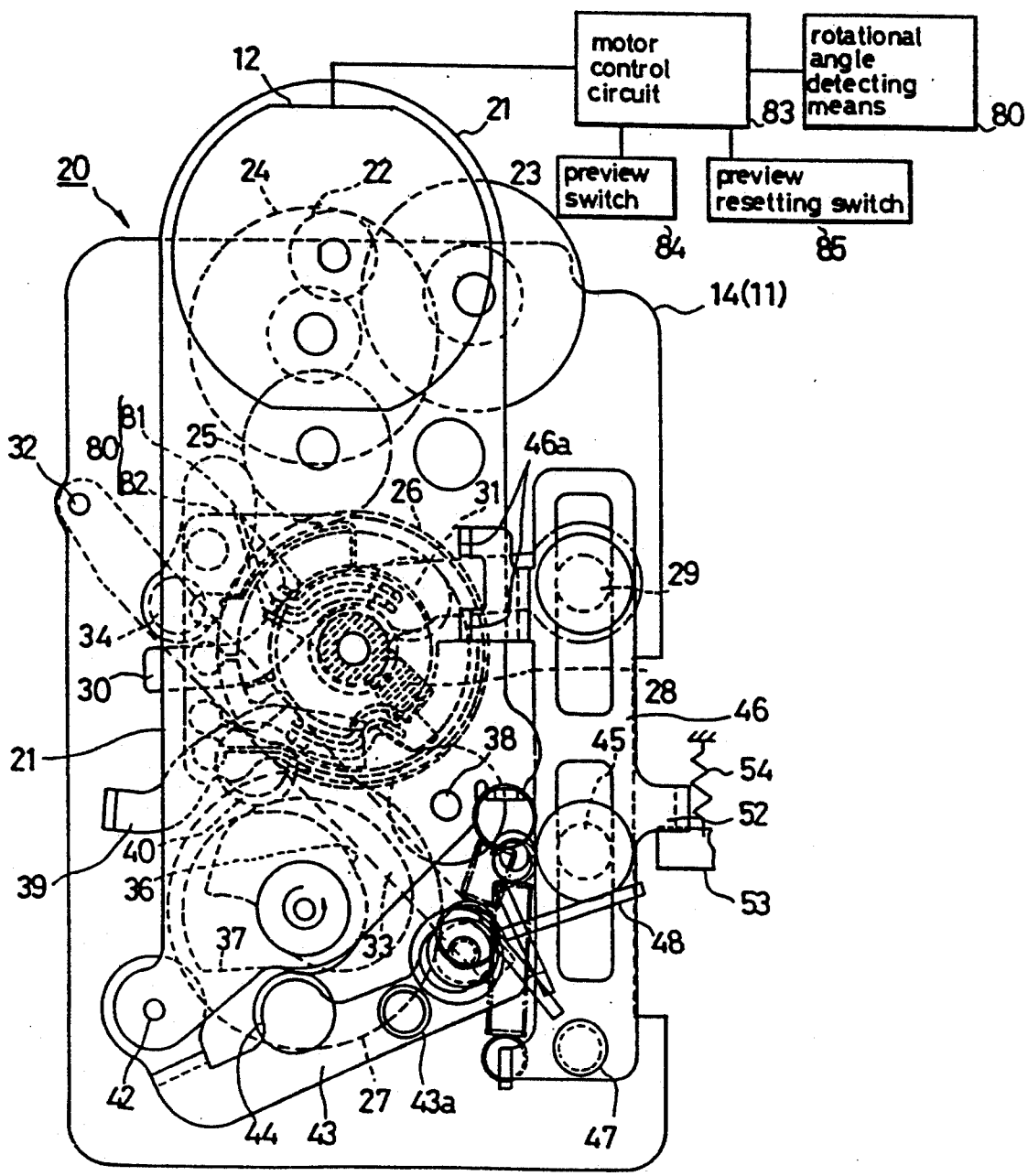

In FIGS. 1A, 1B and 2, which are side elevational views viewed from the arrow I in FIG. 6, the mirror box mechanism 20 is driven by the motor 12. An auxiliary mother plate 21 is secured to the outer surface of the associated mother plate 14, with a predetermined distance therebetween. The motor 12 is secured to the upper end of the auxiliary mother plate 21. The drive shaft of the motor 12 has a pinion 22 secured thereto which is connected to a gear train which is rotatably supported between the mother plate 14 and the auxiliary mother plate 21. The gear train comprises double gears 23 and 24, an idle gear 25, a mirror actuating cam gear 26 and a shutter and diaphragm actuating cam gear 27. The mirror actuating cam gear 26 and the shutter and diaphragm actuating cam gear 27 have the same pitch circles and number of teeth. According to one of the significant features of the present invention, the gears 23, 24, 25, 26 and 27 comprise inexpensive spur gears. This is made possible only by the special arrangement of the drive shaft 16 of the motor 12 perpendicular to the mother plate 14.

The mirror actuating cam gear 26 has a mirror cam 28 that is integral therewith, so that the mirror cam 28 engages a follower roller 31 of a mirror driving lever 30 which is rotatably connected to the mother plate 14 through shaft 29. In FIGS. 1A and 2, the mirror cam 28 is hatched to clearly show the shape thereof. The mirror 33, which is pivoted to the mother plate 14 through a shaft 32, has an elevating pin 34 secured thereto which engages with the front end of the mirror driving lever 30, so that when the mirror driving lever 30 rotates in the clockwise direction in FIGS. 1A, 1B and 2 and moves upward, the mirror 33 moves upward. The time at which the mirror 33 is moved upward and downward is determined in accordance with the time at which the mirror cam 28 elevates the mirror driving lever 30 through the cam follower 31.

The shutter and diaphragm actuating cam gear 27 has a shutter cam 36 and a diaphragm cam 37 which are, both integral with the shutter and diaphragm actuating cam gear 27. The shutter cam 36 is engaged by a follower roller 40 of a shutter set lever 39 which is pivoted to the auxiliary mother plate 21 (mother plate 14) through a shaft 38. When the shutter cam 36 rotates in the clockwise direction in FIG. 2, to disengage the cam surface thereof, the shutter set lever 39 rotates and moves downward to release the mechanical engagement of an electromagnetic focal-plane shutter thereby to permit the latter to move.

The diaphragm cam 37 engages with a follower roller 44 of a diaphragm driving lever 43 which is pivoted to the auxiliary mother plate 21 (mother plate 14) through a shaft 42. The mother plate 14 supports a diaphragm associating plate 46 which is movable up and down by a predetermined distance through a guide shaft 45 and the shaft 29. An association pin 47 is secured to the lower end of the diaphragm associating plate 46. The association pin 47 is engaged by a front end of a strong torsion spring 48, which is provided on the front end of the diaphragm driving lever 43, so that when the diaphragm driving lever 43 is in a descended position (lower position), shown in FIG. 2, the diaphragm associating plate 46 is maintained at the lower position. The diaphragm driving lever 43 is biased to be rotated and moved upward by a tensile spring 49, so that the follower roller 44 is continuously brought into contact with the diaphragm cam 37. The diaphragm associating plate 46 is biased to be moved upward by a tensile spring 50. Consequently, when the diaphragm driving lever 43 is rotated to move upward by the diaphragm cam 37, so that the torsion spring 48 separates from the association pin 47, the diaphragm associating plate 46 moves upward.

The diaphragm associating plate 46 has a diaphragm driving projection 52 integral therewith which is continuously engaged by a diaphragm pin 53 connected to a diaphragm mechanism on the lens side, so that the diaphragm value is determined by the elevated position of the diaphragm associating plate 46. Numeral 54 designates a tensile spring 54 continuously engages the diaphragm driving projection 52 with the diaphragm pin 53. The elevated position of the diaphragm associating plate 46 is determined by the diaphragm control mechanism 60 of an automatic exposure control device which is engaged in a bifurcated portion 46a of the diaphragm associating plate 46. The diaphragm control mechanism 60 will be explained below with reference to FIGS. 3 and 4, which correspond to FIG. 1(1A and 1B) and FIG. 2, respectively.

The diaphragm control device 60 has a mother plate 61 with a sector gear 63 pivoted thereto through a shaft 62. The sector gear 63 has an arm 63b which extends therefrom in a direction opposite to teeth 63a and an association roller 64 which is engaged in the bifurcated portion 46a of the diaphragm associating plate 46. The sector gear 63 is in contact with a small diameter gear 66a of a double gear 66 which is rotatably supported to the mother plate 61 through a shaft 65. The larger diameter gear 66b of the double gear 66 is in contact with a slit disc (circular plate) 68 of a pulse generator (photointerrupter) 67. The slit disc 68 is provided on its circumferencial portion with light transmission slits 69 which are spaced from one another at an equiangular distance. The pulse generator 70 comprises the light transmission slits 69 and a photointerrupter 70 having a light emitter and a light receiver.

Figure 3:
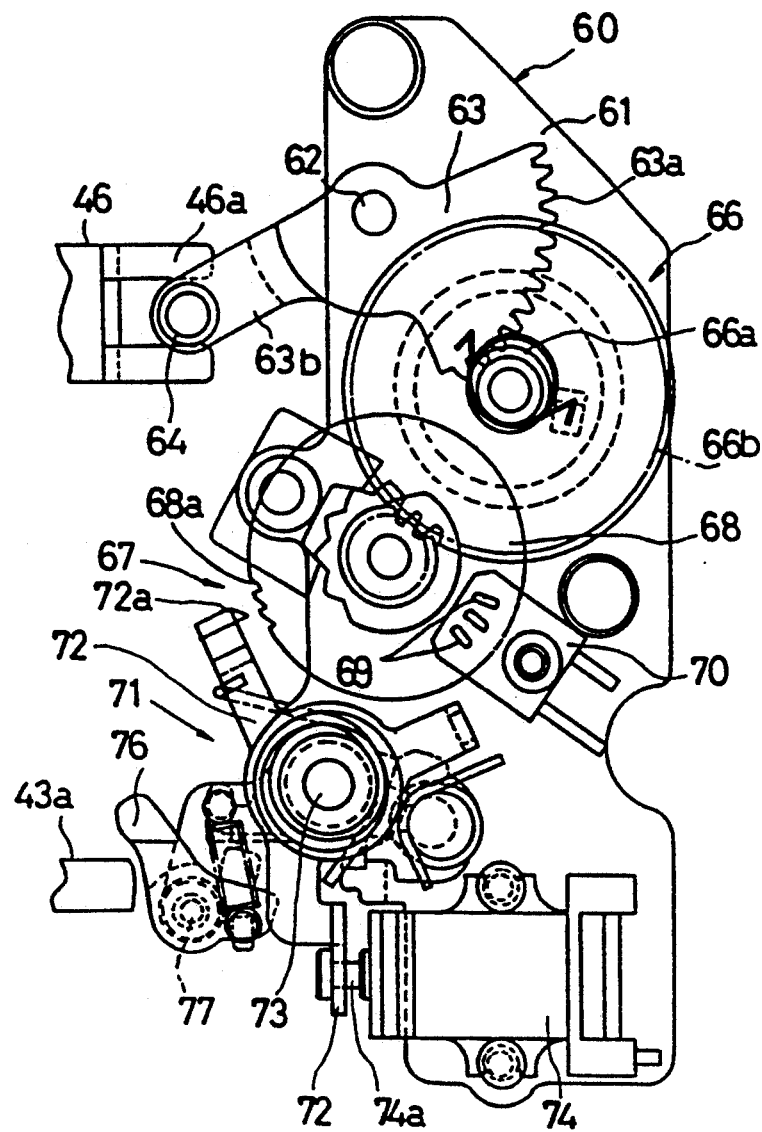
FIGS. 3 and 4 are front elevational views of a diaphragm control mechanism shown in different operational positions.
Figure 4:
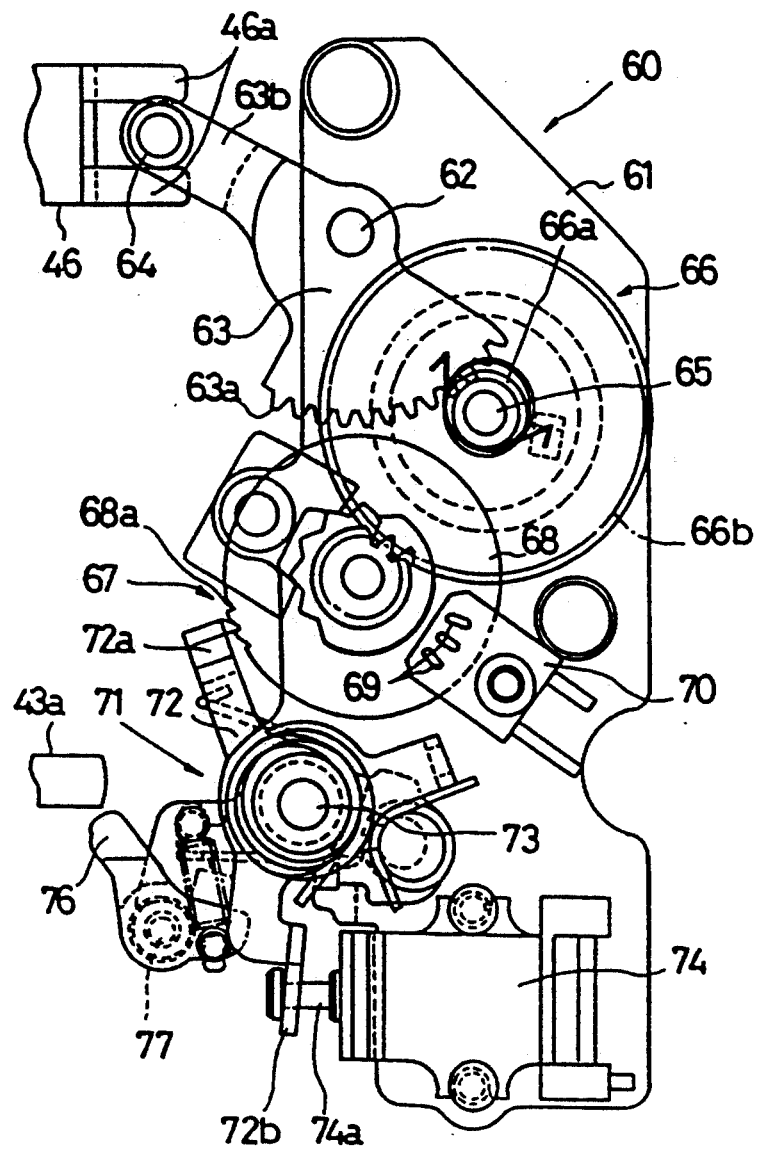

When the diaphragm associating plate 46 is elevated from the initial position shown in FIGS. 1 and 3, the slit disc 68 of the pulse generator 67 rotates through the sector gear 63 and the double gear 66, so that the number of pulses in accordance with the rotational angle (angular displacement) of the slit disc 68 is generated by the photointerrupter 70. The number of pulses corresponds to the elevation position of the diaphragm associating plate 46. Since the diaphragm value corresponds to the elevated position of the diaphragm associating plate 46, as mentioned above, the diaphragm value can be controlled by the control of the number of pulses.

The mother plate 61 has a stop mechanism 71 which stops the rotational movement of the slit disc 68 when the diaphragm associating plate 46 comes to a predetermined elevated position corresponding to a desired diaphragm value. The stop mechanism 71 has a pawl member 72 having an engaging pawl 72a which can be engaged by and disengaged from engaging teeth 68a provided on the periphery of the slit disc 68. The pawl member 72 is pivoted to the mother plate 61 through a shaft 73. The pawl member 72 has an association arm 72b which is connected to a plunger 74a of an engaging magnet 74. When the magnet 74 is not activated, the pawl 72a of the pawl member 72 is disengaged from the teeth 68a of the slit disc 68. On the contrary, when the magnet 74 is activated, the plunger 74a projects therefrom, so that the pawl 72a comes into engagement with the teeth 68a to stop the rotation of the slit disc 68. Consequently, when a predetermined number of pulses of the pulse generator 67 corresponding to the diaphragm value predetermined by the exposure control device is counted, the magnet 74 is activated to obtain a desired diaphragm value.

Numeral 76 designates a return lever mounted to the pawl member 72 through a shaft 77 to release the diaphragm set as mentioned above, in association with a diaphragm control mechanism resetting pin 43a provided on the diaphragm driving lever 43. When the diaphragm associating plate 46 moves downward after it moves upward, the diaphragm driving lever 43 rotates in the clockwise direction in FIG. 2. Upon the rotation of the diaphragm driving lever 43, the resetting pin 43a causes the pawl member 72 to rotate in the counterclockwise direction in FIG. 2 through the return lever 76 to disengage the pawl 72a from the teeth 68a of the slit disc 68. When the resetting pin 43a moves upward from the position shown in FIG. 3, the return lever 76 idles about the shaft 77 with respect to the pawl member 72, so that no movement of the pawl member 72 takes place.

Between the mirror actuating cam gear 26 and the mother plate 14 or the auxiliary mother plate 21 is provided a rotational angle detecting switch 80 which detects the angular position of the previewer. The rotational angle detecting switch 80 detects a rotational angle (angular displacement formed between the positions shown in FIGS. 1 and 2) at which the diaphragm driving lever 43 is actuated but the shutter (shutter set lever 39) and the mirror 33 (mirror driving lever 30) are not actuated after the mirror actuating cam gear 26 and the shutter and diaphragm actuating cam gear 27 are not actuated from the initial position shown in FIG. 1 in the forward direction. The rotational angle detecting switch 80 has a brush 81 and a land plate 82 having a conductor land pattern with which the brush 81 comes into contact. The rotational angle detecting switch 80 also detects the initial rest position of the shutter and diaphragm actuating cam gear 27. The detection signal of the rotational angle detecting switch 80 is sent to a motor control circuit 83 which controls the forward and reverse rotations of the motor 12 in accordance with the detection signal. Alternatively, it is also possible to provide another detecting switch in order to detect the initial rest positions of the shutter and diaphragm actuating gear 27 and the mirror actuating cam gear 26. Note that the rotational angle detecting switch 80 is shown in both forms of an actual switch and a block in FIGS. 1A and 2.

The apparatus of the invention also includes a preview switch 84 and a preview reset switch 85.

The mirror box mechanism 20 as constructed above operates as follows in a normal photographing position:

When the shutter release signal is issued, the motor 12 is driven to rotate in the forward direction, so that the mirror actuating cam gear 26 and the shutter and diaphragm actuating cam gear 27 rotate in the counterclockwise direction by one turn from the initial rest positions shown in FIG. 1 through the pinion 22, the double gears 23 and 24, and the idle gear 25. At the beginning stage of the rotation of the shutter and diaphragm actuating cam gear 27, the diaphragm driving lever 43 moves upward, so that the diaphragm associating plate 46 is elevated to an elevated position determined by the diaphragm control mechanism 60. When the diaphragm associating plate 46 is elevated, the photointerrupter 70 counts the number of pulses in accordance with the upward displacement of the diaphragm associating plate 46. When the number of pulses reaches a predetermined value, corresponding to a predetermined diaphragm value, the magnet 74 is energized to stop the rotation of the slit disc 68. The slit disc 68 stops rotating and the diaphragm associating plate 46 no longer moves up, so that the diaphragm of the lens stops-down to a predetermined diaphragm value by the diaphragm pin 53 which moves together with the diaphragm driving projection 52.

By a further rotation of the shutter and diaphragm actuating cam gear 27, the shutter setting lever 39 descends, so that the mechanical engagement of the electromagnetic focal plane shutter is released to allow the shutter to move.

When the mirror actuating cam gear 26 rotates, the mirror cam 28 moves the mirror driving lever 30 up to elevate the mirror 33 after the stop-down of the diaphragm of the lens is completed by the rotation of the shutter and diaphragm actuating cam gear 27. Upon the completion of the elevation of the mirror 33, the shutter moves and then stops. After the movement of the shutter is completed, the mirror driving lever 30 and the mirror 33 descend. The diaphragm driving lever 43, the diaphragm associating plate 46 and the shutter setting lever 39 are returned to the respective initial rest positions shown in FIG. 1 by the rotation of the shutter and diaphragm actuating cam gear 27, so that the lens is returned to an open position.

As can be understood from the foregoing, in the normal release operation, the mirror actuating cam gear 26 and the shutter and diaphragm actuating cam gear 27 rotate by one turn in the forward direction (counterclockwise direction in FIG. 1) from the rest position shown in FIG. 1.

Figure 5:
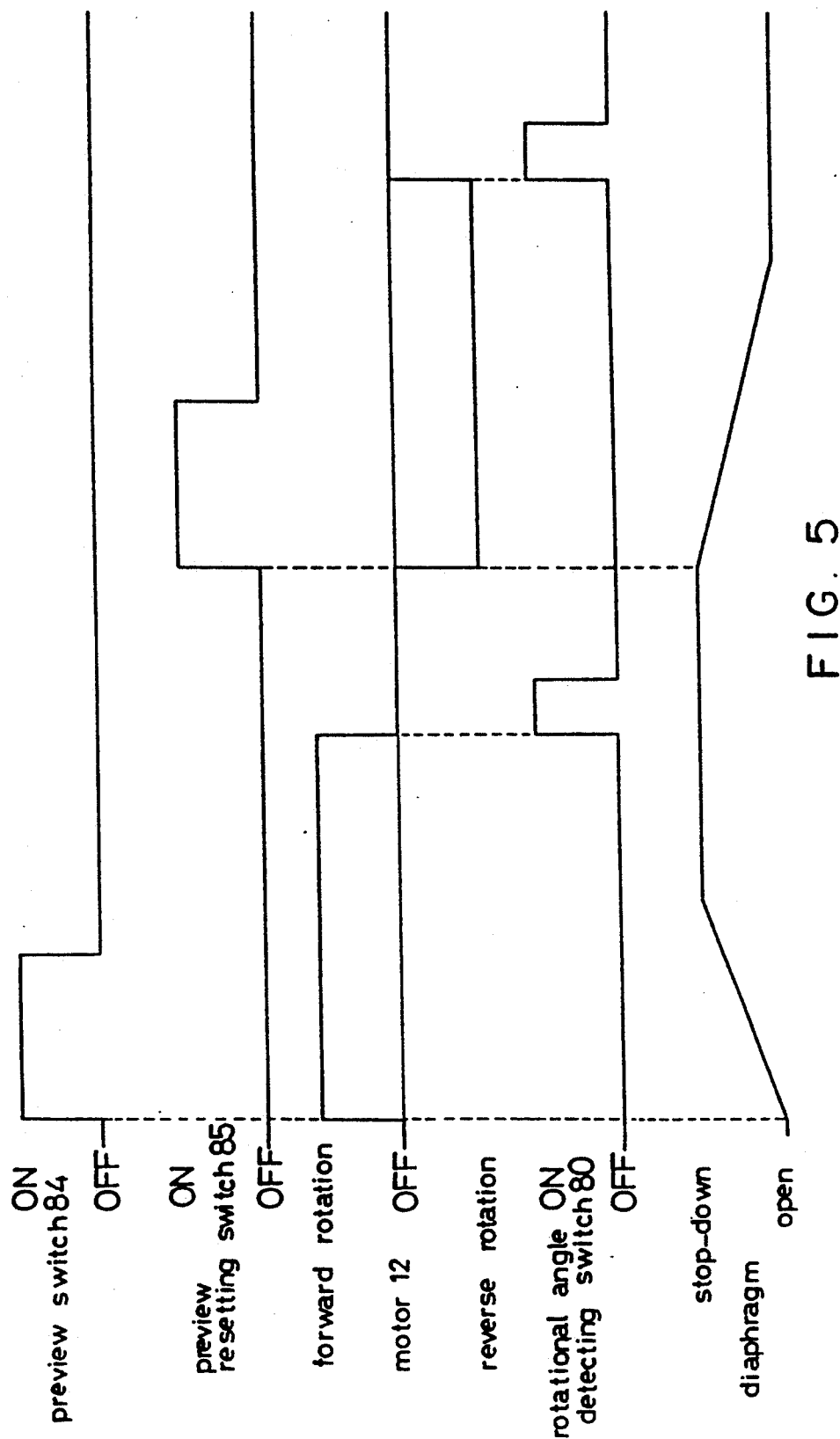
FIG. 5 is a time chart of the depth detecting apparatus (previewer) according to the present invention; and, FIG. 6 is a front elevational view of a mirror box, a mirror box driving mechanism and a driving motor, according to the present invention.

The confirmation or detection of the focal depth can be effected as follows (see FIG. 5):

When the preview switch 84 is turned ON, the mirror actuating cam gear 26 and the shutter and diaphragm actuating cam gear 27 rotate from the rest position shown in FIG. 1 to the preview rotation position shown in FIG. 2. After that, when the preview reset switch 85 is turned ON, the mirror actuating cam gear 26 and the shutter and diaphragm actuating cam gear 27 are reversed from the position shown in FIG. 2 to the position shown in FIG. 1.

First, when the preview switch 84 is turned ON, the motor 12 rotates in the forward direction, so that the mirror actuating cam gear 26 and the shutter and diaphragm actuating cam gear 27 rotate in the forward direction. When the mirror actuating cam gear 26 comes to an angular position shown in FIG. 2, the rotational angle detecting switch 80 detects the angular position, so that the motor control circuit 83 sends a stop signal to the motor 12. In FIG. 2, as mentioned before, the diaphragm driving lever 43 rotates in the counterclockwise direction, so that the torsion spring 48 disengages from the association pin 47 of the diaphragm associating plate 46. Therefore, the diaphragm associating plate 46 moves up to a height level corresponding to the diaphragm value determined by the diaphragm control mechanism 60, so that the diaphragm of the lens stops-down to a desired diaphragm value to confirm or detect the focal depth. The sequence mentioned above is the same as that of the determination of the diaphragm value in the normal photographing operation. Accordingly, the depth by the set diaphragm value can be detected even in a programmed mode. In the state shown in FIG. 2, the mirror cam 28 of the mirror actuating cam gear 26 does not come into contact with the follower roller 31 of the mirror driving lever 30. Thus, mirror 33 does not move. The shutter cam 36 holds the shutter setting lever 39 at the elevated position and, accordingly the shutter does not operate.

In the preview state shown in FIG. 2, when the previewer resetting switch 85 is turned ON, the motor 12 is reversed, the mirror actuating cam gear 26 and the shutter and diaphragm actuating cam gear 27 are reversed. When the rotational angle detecting switch 80 detects that the mirror actuating cam gear 26 and the shutter and diaphragm actuating cam gear 27 come to the respective initial rest positions, the motor control circuit 83 stops the motor 12. Thus, the apparatus is returned to the initial position shown in FIG. 1. The diaphragm driving lever 43 and the diaphragm associating plate 46 are descended by the reverse rotation of the shutter and diaphragm actuating cam gear 27, so that the diaphragm of the lens is returned to an open position.

The preview switch 84 and the preview resetting switch 85 can be made of different operation members or of the same operation member. In the latter case, for example, the preview can be effected by a half-step push of a single switch and the reset can be effected by a full-step push of the same switch. Alternatively, it is also possible to perform the preview by a pushing operation of a single switch and the reset by a return operation thereof, respectively.

In the mirror box mechanism mentioned above, since the drive shaft 16 of the motor 12 is perpendicular to the mother plate 14, the pinion 22 and the gear train engaging therewith are all spur gears which are inexpensive and which have a high power transmission efficiency. Furthermore, since the motor 12 can be supported by the auxiliary mother plate 21 integral with the mother plate 14, the mirror box mechanism 20 including the motor 12 can be united, resulting in an easy sub-assembly or whole assembly.

Note that the motor 12 can be provided on the lower portion of the camera body, as shown at 12a in FIG. 6. In this alternative, the motor 12 is located on the spool side of the mirror box 11 and the drive shaft 16 of the motor 12 is perpendicular to the mother plate 14. However, in the existing AF single-lens reflex camera, a space necessary for the provision of the motor 12 can be provided on the upper portion of the camera body rather than the lower portion, as mentioned above.

The apparatus according to the present invention is not limited to the mirror box mechanism 20 as mentioned above and can be applied to other electrically driven apparatuses in which the preview is made possible by rotating the mirror actuating cam gear and the shutter and diaphragm actuating cam gear by a predetermined angular displacement smaller than one turn in which the mirror actuating cam gear and the shutter and diaphragm actuating cam gear can be returned to their initial positions by reversing the same.

Note that there is no limitation of the recording medium in a single-lens reflex camera, in the present invention. Namely, the present invention can be applied not only to a silver halide film camera, but also to a still video camera.

As can be seen from the above discussion, according to the present invention, since the drive motor is located on the spool side of the mirror box, so that the drive shaft of the motor extends perpendicularly to the mother plate on the side face of the mirror box, and since the pinion of the drive shaft of the motor and the gear train engaging therewith are all made of spur gears, an inexpensive driving mechanism having a high power transmission efficiency can be obtained. In addition, the mirror box mechanism including the motor can be united as a whole, resulting in an easy assembly.

Furthermore, in the depth detecting apparatus utilizing the mirror driving apparatus in a single-lens reflex camera according to the present invention, the depth can be simply and easily detected or confirmed with a small force by the preview rotation angle detecting means of a mirror actuating cam gear and the shutter and diaphragm actuating cam gear which actuates the diaphragm and does not actuate the mirror and the shutter, and by the forward and reverse rotations of the motor in accordance with the operations of the preview switch and the previewer resetting switch. In addition, in the programmed mode, the depth can be certainly confirmed or detected. Furthermore, since there is no mechanical association between the operation members and the diaphragm mechanism, the positional restriction of the preview switch and the resetting switch can be damped.

We claim:

1. An apparatus for driving a mirror of a single-lens reflex camera, comprising:
    a mirror box that is associated with a mirror box mechanism;
    a mother plate for supporting said mirror box;
    a spur gear train that is rotatably connected to said mother plate; and
    a motor having a drive shaft with a spur gear pinion that is integral therewith for driving said gear train, said motor being located outside of said mirror box, so that said drive shaft is positioned perpendicular to a plane of said mother plate, said motor being driven in a first direction to shift said mirror from an initial position, said motor being driven in a second direction to shift said mirror back to said initial position.

2. A mirror driving apparatus according to claim 1, wherein said motor is located above said mirror box.

3. A mirror driving apparatus according to claim 1, wherein said motor is located below said mirror box.

4. The apparatus of claim 1, wherein said gear train comprises a shutter and diaphragm actuating cam gear that actuates a shutter and a diaphragm in accordance with a rotation of said gear train, and a mirror actuating cam gear that actuates a mirror in accordance with a rotation of said mirror actuating cam gear, said shutter and diaphragm actuating cam gear engaging said mirror actuating cam gear, so that at least one of said shutter and diaphragm actuating cam gear and said mirror actuating cam gear is connected to said pinion of said drive shaft of said motor through either said mirror actuating cam gear or said shutter and diaphragm actuating cam gear.

5. A single-lens reflex camera, comprising:
    a shutter associated with said camera;
    a mirror associated with said camera;
    a mirror box having a mirror actuating cam gear and a shutter and diaphragm actuating cam gear;
    a motor for driving said mirror actuating cam gear and said shutter and diaphragm actuating cam gear from respective initial rest positions to where a diaphragm associated with said camera is stopped-down to a predetermined diaphragm value, said driving of said mirror actuating cam gear and said shutter and diaphragm actuating cam gear causing said mirror to be retracted prior to an actuation of said shutter;
    means for detecting a preview rotational angle at which said diaphragm is stopped-down to said predetermined diaphragm value but said shutter has not been actuated, after said mirror actuating cam gear and said shutter and diaphragm actuating cam gear have been driven by said motor;
    a shutter release switch for actuating said shutter;
    a preview switch for sending a forward rotation signal to said motor, said preview switch being separate from said shutter release switch;
    a motor control circuit for initiating a forward rotation of said motor in accordance with said forward rotation signal and for stopping said motor when said rotational angle detecting means detects said preview rotational angle; and
    a preview resetting switch for issuing a reverse rotation signal to said motor control circuit after said forward rotation of said motor stops so as to reverse said motor, said reversing of said motor stopping when said mirror actuating cam gear and said shutter and diaphragm actuating cam gear are returned to their respective initial rest positions.

6. The apparatus of claim 5, wherein said rotational angle detecting means issues a stop signal to said motor control circuit to stop said reversing of said motor.

7. The apparatus of claim 5, wherein said preview switch and said preview resetting switch comprise a single switch which can occupy different operational positions, so that both said preview switch and said preview resetting switch are operated by different operational positions of said single switch.

8. The apparatus of claim 5, wherein said mirror actuating cam gear and said shutter and diaphragm actuating cam gear comprise spur gears which have an equal number of teeth so that said mirror actuating cam gear and said shutter and diaphragm actuating cam gear can engage each other.

9. The apparatus of claim 8, further comprising a mother plate which rotatably supports said mirror actuating cam gear and said shutter and diaphragm actuating cam gear.

10. The apparatus of claim 9, wherein said motor is supported by said mother plate, so that a driving shaft of said motor is perpendicular to said mother plate.

11. The apparatus of claim 10, wherein said driving shaft of said motor has a pinion which is connected to at least one of said mirror actuating cam gear and said shutter and diaphragm actuating cam gear.

12. The apparatus of claim 11, wherein said pinion is connected directly to at least one of said mirror actuating cam gear and said shutter and diaphragm actuating cam gear.

13. The apparatus of claim 11, wherein said pinion is connected through an idler gear to at least one of said mirror actuating cam gear and said shutter and diaphragm actuating cam gear.

14. An apparatus for driving a mirror of a single-lens reflex camera, comprising:
    a motor for providing a driving force for raising and lowering said mirror in said camera and for providing a driving force for stopping down a diaphragm of said camera;
    a gear train operatively connected to said motor, said gear train transmitting said driving force to said mirror and to said diaphragm; and
    a motor control circuit which performs a preview function by controlling said motor to drive said diaphragm without raising or lowering said mirror, in response to detection signals that are issued by said camera to said motor control circuit in response to at least a partial actuation of a shutter release switch on said camera.

15. A preview apparatus for a diaphragm in a single-lens reflex camera, comprising a rotatable motor associated with said diaphragm, preview means for rotating said motor in a direction for stopping-down said diaphragm to a predetermined diaphragm value, and preview resetting means for reversing said rotatable motor in a direction for opening said diaphragm;
    said rotatable motor being further associated with a movable mirror which reflects light to a viewer of said single-lens reflex camera in a first position and, when retracted to a second position, does not reflect light to the viewer;

said preview apparatus controlling said rotatable motor to stop down a diaphragm of said camera for previewing an object to be photographed; wherein said movable mirror remains in said first position when said preview means controls said rotatable motor to stop down the diaphragm for previewing.

16. The apparatus of claim 15, wherein said preview means stops the operation of said motor before said mirror is driven.

17. The apparatus of claim 15, wherein said single-lens camera comprises a shutter, said apparatus further comprising means for maintaining said shutter inoperative during previewing.

18. The apparatus of claim 15, further comprising a spur gear gear train for translating the rotation of said motor to said diaphragm.

19. The apparatus of claim 15, said preview means further comprising a rotational angle detecting switch for detecting when to stop the operation of said motor.

20. The apparatus of claim 14, wherein said gear train comprises a spur gear gear train.

* * * * *